US012311520B2

(12) United States Patent
Wang et al.

(10) Patent No.: US 12,311,520 B2
(45) Date of Patent: May 27, 2025

(54) LONG-ROD-TYPE ELECTRIC TOOL

(71) Applicant: TECHTRONIC CORDLESS GP, Anderson, SC (US)

(72) Inventors: Yan Jia Wang, Anderson, SC (US); Wai Chung Lee, Anderson, SC (US); Zheng Jun Wang, Anderson, SC (US); Jin Cheng Li, Anderson, SC (US); Dong Wei Li, Anderson, SC (US); Zhi Yang Li, Anderson, SC (US); Koon For Chung, Anderson, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 731 days.

(21) Appl. No.: 17/523,858

(22) Filed: Nov. 10, 2021

(65) Prior Publication Data

US 2022/0143802 A1 May 12, 2022

(30) Foreign Application Priority Data

Nov. 12, 2020 (CN) .......................... 202022616593.8

(51) Int. Cl.
*B08B 5/02* (2006.01)
*A01G 20/47* (2018.01)
(Continued)

(52) U.S. Cl.
CPC ................ *B25F 5/02* (2013.01); *A01G 20/47* (2018.02); *A47L 5/14* (2013.01); *B08B 5/02* (2013.01); *B25G 1/06* (2013.01); *B25G 3/38* (2013.01)

(58) Field of Classification Search
CPC ... B25F 5/02; A47L 5/14; A01G 20/47; B08B 5/02
(Continued)

(56) References Cited

U.S. PATENT DOCUMENTS 4,760,646 A * 8/1988 Siegler ..................... A01G 3/08
30/388
8,510,910 B1 * 8/2013 Ramsey .................... B08B 5/02
15/410
(Continued)

FOREIGN PATENT DOCUMENTS

DE    102012212786 A1    1/2014
EP       3246127 A1    11/2017
EP       3533313 A1     9/2019

OTHER PUBLICATIONS

European Search Report Corresponding with Application No. EP21206846 on Apr. 13, 2022 (2 pages); EP Communication of Supplemental EP Search Report for EP Application EP21206846 with the date of May 4, 2022.

*Primary Examiner* — Bryan R Muller
(74) *Attorney, Agent, or Firm* — Dority & Manning, P.A.

(57) ABSTRACT

The utility model discloses a long-rod-type electric tool, comprising: a handle assembly, the handle assembly comprising a power supply unit; a machine head assembly, the machine head assembly comprising a driving unit and an operating unit connected to the driving unit; a long rod assembly, the long rod assembly being arranged between the handle assembly and the machine head assembly; and at least one interface. The long-rod-type electric tool is configured to make an orientation of the operating unit relative to the long rod assembly adjustable in at least one degree of freedom by means of the at least one interface.

19 Claims, 9 Drawing Sheets

(51) Int. Cl.
*A47L 5/14* (2006.01)
*B25F 5/02* (2006.01)
*B25G 1/06* (2006.01)
*B25G 3/38* (2006.01)

(58) Field of Classification Search
USPC .......................... 15/144.2, 144.3, 144.4, 145
See application file for complete search history.

(56) References Cited

U.S. PATENT DOCUMENTS

| | | | |
|---|---|---|---|
| 8,793,886 B2* | 8/2014 | Yamaoka | A01G 3/053 |
| | | | 30/340 |
| 9,267,291 B1* | 2/2016 | Ramsey | E04D 13/0765 |
| 9,751,176 B2* | 9/2017 | McRoberts | B25F 5/02 |
| 10,375,896 B2* | 8/2019 | Sheffer | B25G 1/04 |
| 2002/0194739 A1* | 12/2002 | Krane | A01G 3/08 |
| | | | 30/296.1 |
| 2007/0000138 A1* | 1/2007 | Baskar | A01G 3/0417 |
| | | | 30/392 |
| 2012/0317821 A1* | 12/2012 | Tsuchiya | A01G 3/053 |
| | | | 30/196 |

* cited by examiner

LONG-ROD-TYPE ELECTRIC TOOL

This application claims the benefit of priority to Chinese Patent Application No. 202022616593.8, filed on Nov. 12, 2020, the disclosure of which is incorporated by reference herein in its entirety.

TECHNICAL FIELD

The utility model relates to a long-rod-type electric tool, and in particular, to a long-rod-type electric tool that adjusts an orientation of an operating unit by means of an interface.

BACKGROUND ART

As common garden tools, long-rod-type electric tools are becoming increasingly popular. Common long-rod-type electric tools include but are not limited to gutter cleaners, lawnmowers, trimmers, pruners, cultivators, etc. As a detachable or non-detachable long rod assembly is provided, a user can hold a handle assembly, while using an electric tool, to flexibly adjust a distance between a machine head assembly and the handle assembly, operate an operation object remotely, and reduce waist fatigue or risks caused by use of a ladder. However, as an operating unit is relatively far away from the user, the manoeuvrability is poor, and thus there is a need for a long-rod-type electric tool that can flexibly adjust an orientation of the operating unit.

SUMMARY OF THE UTILITY MODEL

In view of the above-mentioned background, an objective of the utility model is to provide a long-rod-type electric tool that adjusts an orientation of an operating unit by means of an interface.

Other objectives of the utility model will be derived by those skilled in the art from the following description. Therefore, the above-mentioned object statement is not exhaustive, but only used to illustrate some of the many objectives of the utility model.

Therefore, according to an aspect of the utility model, a long-rod-type electric tool is provided, comprising: a handle assembly, the handle assembly comprising a power supply unit; a machine head assembly, the machine head assembly comprising a driving unit and an operating unit connected to the driving unit; a long rod assembly, the long rod assembly being arranged between the handle assembly and the machine head assembly; and at least one interface. The long-rod-type electric tool is configured to make an orientation of the operating unit relative to the long rod assembly adjustable in at least one degree of freedom by means of the at least one interface.

In some embodiments, the long-rod-type electric tool comprises a first interface and a second interface, wherein the orientation of the operating unit relative to the long rod assembly is respectively adjustable in a first degree of freedom by means of the first interface and adjustable in a second degree of freedom by means of the second interface.

In some embodiments, an orientation of the driving unit is pivotable relative to a first axis, and the orientation of the operating unit is pivotable relative to a second axis.

In some embodiments, the operating unit is pivotable relative to the driving unit.

In some embodiments, the at least one interface is formed between a first component and a second component, the at least one interface comprises a first engagement feature provided on the first component and a second engagement feature provided on the second component, and engagement between the first engagement feature and the second engagement feature restricts movement of the first component relative to the second component.

In some embodiments, the first engagement feature comprises a plurality of notches arranged in a circumferential direction, and the second engagement feature comprises at least one protrusion configured to be engaged with the plurality of notches.

In some embodiments, the second engagement feature comprises a locking member, and engagement of the locking member with the second component restricts movement of the locking member relative to the second component in the at least one degree of freedom.

In some embodiments, the locking member comprises an elastic biasing member.

In some embodiments, at least one of the first component and the second component comprises a visual indicating device, and the visual indicating device is configured to indicate movement of the first component relative to the second component in the at least one degree of freedom.

In some embodiments, at least one of the first component and the second component comprises an auditory indicating device, and the auditory indicating device is configured to indicate movement of the first component relative to the second component in the at least one degree of freedom.

In some embodiments, the auditory indicating device comprises a plurality of notches arranged in a circumferential direction, and an elastic member configured to be engaged with the plurality of notches to issue an auditory indication.

In some embodiments, one of the first component and the second component is the long rod assembly, and the other of the first component and the second component is the machine head assembly.

In some embodiments, one of the first component and the second component is the operating unit, and the other of the first component and the second component is the driving unit.

In some embodiments, the machine head assembly comprises a protective cover arranged near the operating unit.

In some embodiments, an orientation of the protective cover relative to the operating unit is adjustable.

BRIEF DESCRIPTION OF THE DRAWINGS

The foregoing and other features of the utility model will become apparent from the following description of preferred embodiments provided by way of example only and in conjunction with accompanying drawings, in which.

DETAILED DESCRIPTION OF EMBODIMENTS

Figure 1:
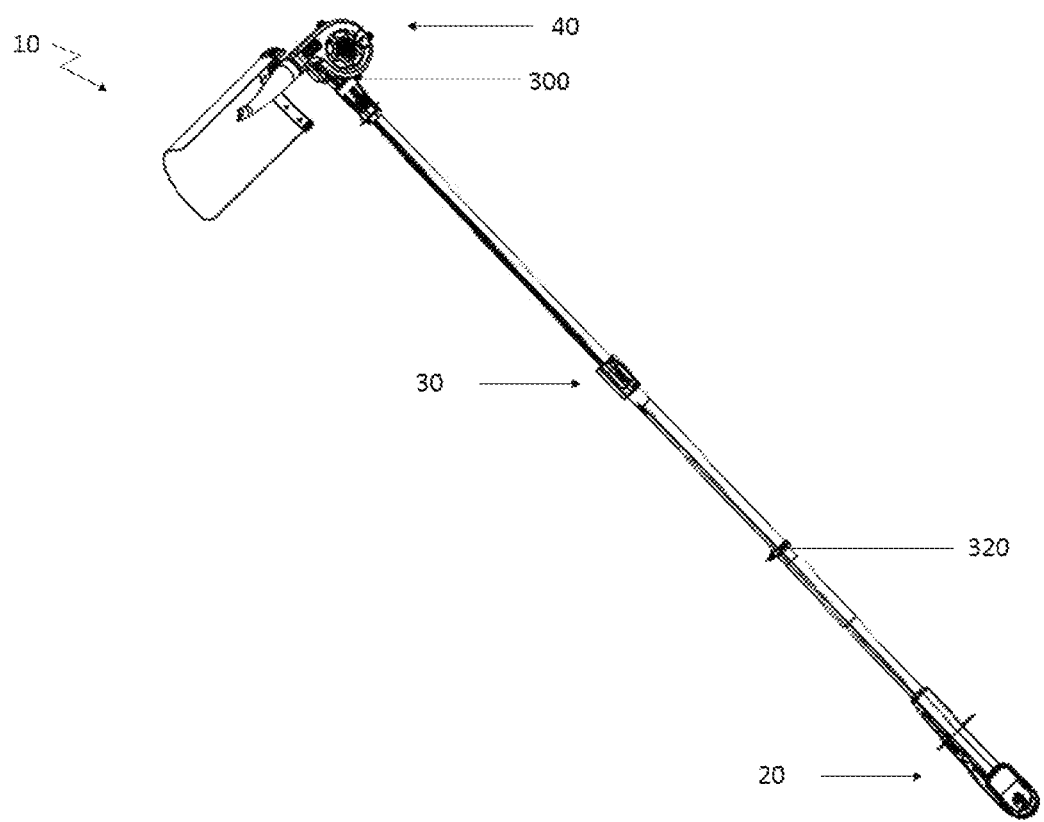
FIG. 1 illustrates a schematic diagram of a long-rod-type electric tool according to an embodiment of the utility model.

In the subsequent claims and the foregoing description of the utility model, the word "comprise" or, for example, a variant (such as "include" or "contain") is used in an inclusive manner, i.e., it indicates the existence of the described features, but does not exclude the existence or addition of other features in various embodiments of the utility model.

For example, the terms "horizontal", "vertical", "transverse", "longitudinal", "above", "below" and the like used herein are intended to describe the utility model according to an orientation of the utility model in normal use, and are not intended to limit the utility model to any specific orientation.

It should be understood that if any publication of the prior art is cited herein, such a reference does not constitute an admission that the publication forms part of the common general knowledge in the art in any country.

In the utility model, a long-rod-type electric tool that adjusts an orientation of an operating unit by means of an interface includes but is not limited to a gutter cleaner, a lawnmower, a trimmer, a pruner, a cultivator, etc. The following description takes the gutter cleaner as an example in conjunction with the accompanying drawings and embodiments.

Reference numerals are listed below:

long-rod-type electric tool 10; handle assembly 20, handle housing 210, rechargeable battery interface 220; long rod assembly 30, adapter 300, earmuff-shaped housing 311, circular opening 312, notch 313, mark 315, hollow columns 316 and 317, auxiliary handle 320; machine head assembly 40; driving unit 50, motor output shaft 510, driving unit housing 520, hollow columns 521 and 522, receiving hole 521a, supporting surface 521b, retention hole 523, upper disc 530, U-shaped arm 531, locking pin slot 532, elastic member 533, two arms 533a, protrusion 533b, elastic member slot 535, lower disc 540, boss 541, protrusion 542; operating unit 60, impeller 610, air outlet duct 620, air inlet 621, air outlet 622, wedge-shaped scraping edge 623, mounting hook 624, operating unit housing 630, circular opening 631, notch 632, deeper notch 632a, mark 636, L-shaped sliding groove 637; protective cover 70, connecting rod 710, rivets 711a and 711b, knobs 712a, 712b, fasteners 713a and 713b, cover edge 720, receiving hole 720b, cover surface 730; locking member 810, retention column 811, spring-passing member 812, cylinder-like body 813, protrusion 815, button 816, circular supporting disc 818, biasing spring 820; locking member 910, spring-passing member 912, locking pin 913, near-notch part 913a, near-slot part 913b, U-shaped arm 914, button 916, lug 917, biasing spring 920.

FIG. 1 illustrates a schematic diagram of a long-rod-type electric tool 10 according to an embodiment of the utility model. The long-rod-type electric tool 10 may comprise a handle assembly 20, a machine head assembly 40 and a long rod assembly 30 arranged between the handle assembly 20 and the machine head assembly 40. The long rod assembly 30 may be composed of one or more sections and is configured with an adjustable length or a non-adjustable length. In the embodiment shown in FIG. 1, the long rod assembly 30 is a two-section telescopic rod with an adjustable length. The long rod assembly 30 may comprise an adapter 300 and may be engaged with the handle assembly 20 or the machine head assembly 40 through the adapter 300. The long rod assembly 30 is optionally configured with an auxiliary handle 320. In some embodiments, the auxiliary handle 320 is configured to mount a shoulder strap (not shown).

Figure 2:
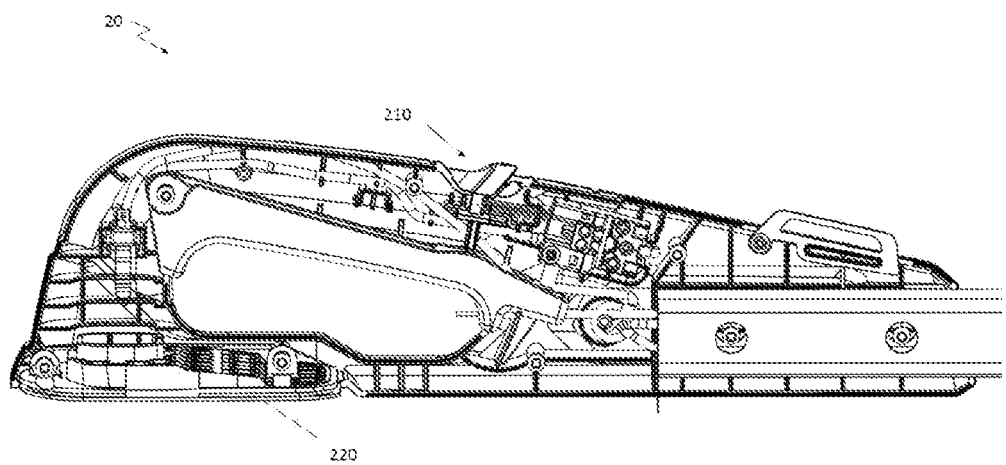
FIG. 2 illustrates a schematic diagram of a handle assembly according to an embodiment of the utility model.

FIG. 2 illustrates a schematic diagram of a handle assembly 20 according to an embodiment of the utility model. The handle assembly 20 is provided with a handle housing 210 (only one half is shown). One end of the handle assembly 20 may be provided with a control unit and a power supply unit. The control unit comprises various switches, one or more control circuit boards, etc. The control unit may also be partially arranged at one end of the machine head assembly 40. The power supply unit includes but is not limited to a rechargeable battery and an AC power supply. In the embodiment shown in FIG. 2, the handle housing 210 provides an interface 220 for engaging the rechargeable battery. In some embodiments, the rechargeable battery may be provided in the handle housing 210, and only a charging port is provided on the handle housing 210. Those skilled in the art can understand that the above-mentioned embodiments are not restrictive.

Figure 3:
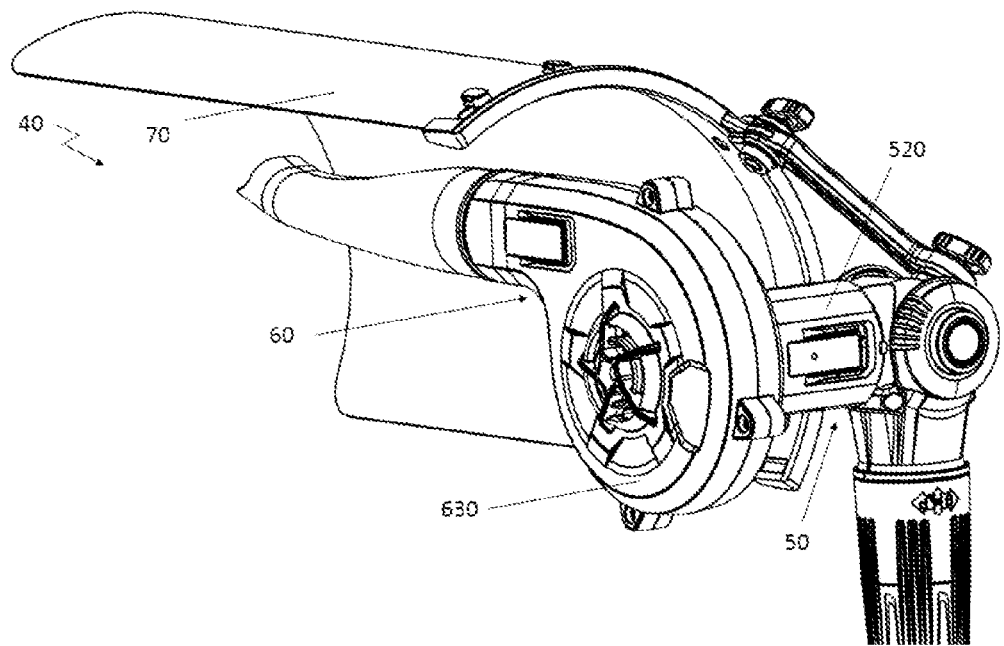
FIG. 3 illustrates a schematic diagram of a machine head assembly according to an embodiment of the utility model.

FIG. 3 illustrates a schematic diagram of a machine head assembly 40 according to an embodiment of the utility model. One end of the machine head assembly 40 may be provided with a driving unit 50 and an operating unit 60 connected to the driving unit 50. The driving unit 50 is provided with a driving unit housing 520 that can accommodate a motor (and/or a gear set or another transmission structure). The operating unit 60 is provided with an operating unit housing 630. The machine head assembly 40 is optionally configured with a protective cover 70 arranged near the operating unit 60.

Figure 4:
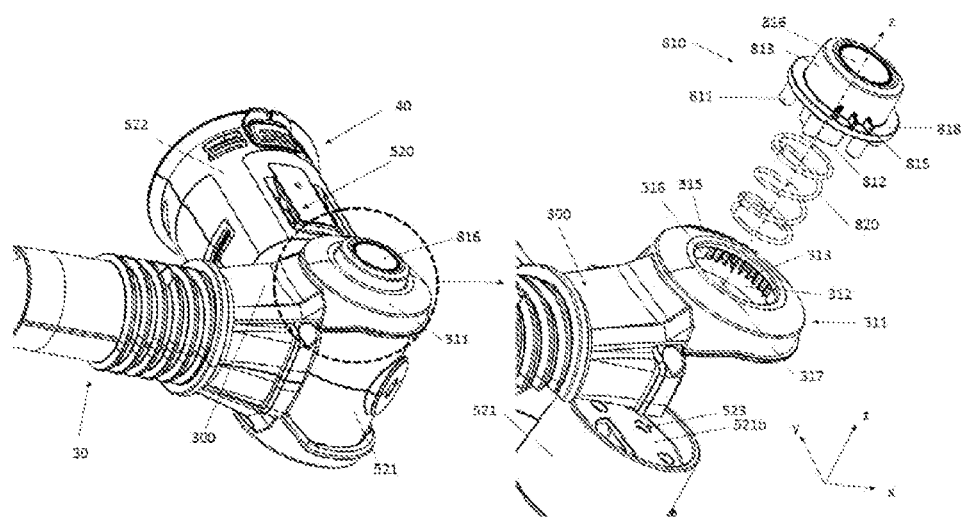
FIGS. 4 and 5 illustrate schematic diagrams of engagement between a long rod assembly and a machine head assembly according to an embodiment of the utility model.
Figure 5:
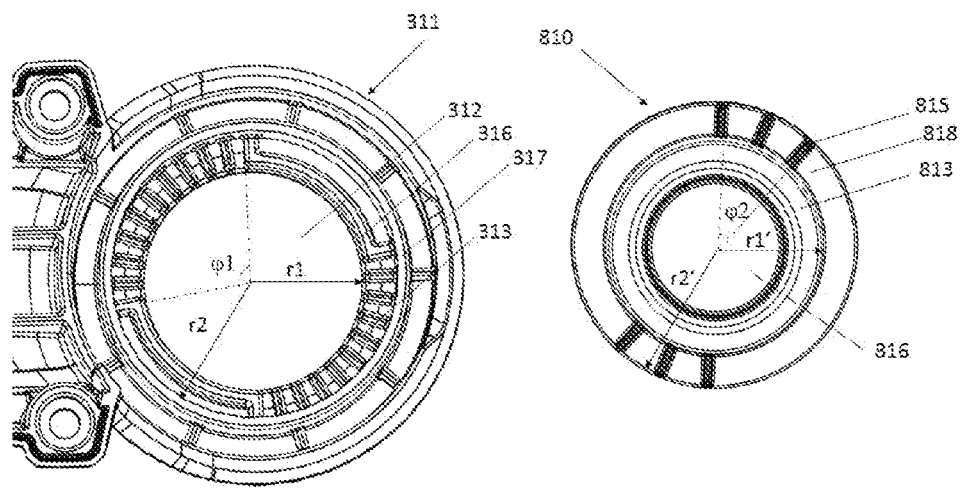

FIGS. 4 and 5 illustrate schematic diagrams of engagement between a long rod assembly 30 and a machine head assembly 40 according to an embodiment of the utility model. In FIG. 4, the operating unit 60 and the protective cover 70 are hidden from the left figure, and the right figure is an exploded view of an engagement part, wherein the x-axis is an extending direction of the long rod assembly 30, the y-axis is an extending direction of a motor output shaft 510 (FIG. 9), and the z-axis is perpendicular to a plane (xy-plane) formed by the x-axis and the y-axis. For ease of description, the positive direction of the z-axis is taken as the upward direction and the reverse direction is taken as the downward direction.

In the embodiment shown in FIG. 4, one end of the driving unit housing 520 near the long rod assembly 30 forms a hollow column 521 with the z-axis as the axis, and the other end forms a hollow column 522 with the y-axis as the axis, wherein the hollow column 521 is engaged with the long rod assembly 30, and the hollow column 522 accommodates driving components such as a motor. The adapter 300 is formed by an upper housing and a lower housing, and only the upper housing is internally provided with a locking member 810. The right figure of FIG. 4 illustrates only the upper housing. A housing of the adapter 300 (especially an earmuff-shaped housing 311) and the hollow column 521 are engaged along an end face and/or a side face to form a substantially closed structure. The earmuff-shaped housing 311 below refers to only the upper housing.

The left figure of FIG. 5 illustrates a view of the earmuff-shaped housing 311 viewed from the inside, and the right figure illustrates a view of the locking member 810 viewed from the outside. In conjunction with FIGS. 4 and 5, a circular opening 312 with a radius r1 is formed at the top of the earmuff-shaped housing 311, a hollow column 316 with a bottom radius r1 is formed below the circular opening 312, and another hollow column 317 with a bottom radius r2 is formed below the hollow column 316, wherein r1<r2. The centre of the circular opening 312, the axis of the hollow column 316 and the axis of the hollow column 317 are all located on the z-axis. A plurality of notches 313 are arranged in a circumferential direction on an inner peripheral surface of the hollow column 316, and a radial depth of the notches 313 is equal to or slightly less than r2-r1. In the embodiment shown in FIG. 5, the plurality of notches 313 are arranged in the same radian range of two opposite sections in the circumferential direction, and the radian of each section is $\varphi 1$.

A cylinder-like body 813 with a bottom radius r1' is formed at the top of the locking member 810, and a circular supporting disc 818 with a radius r2' is formed below the cylinder-like body 813, wherein r1' is equal to or slightly less than r1 and r2' is equal to or slightly less than r2. A spring-passing member 812 and one or more retention columns 811 are formed below the circular supporting disc 818, wherein the axis of the cylinder-like body 813 and the centre of the circular supporting disc 818 are both located on the z-axis. At least one protrusion 815 is formed on a side face of the cylinder-like body 813 near a bottom side of the circular supporting disc 818, and a length of the protrusion 815 in a radial direction is roughly equal to or slightly less than r2'-r1'. In the embodiment shown in FIG. 5, three protrusions 815 are formed in the radian $\varphi 1$ of each section where the notches 313 are arranged. The radian spanned by the three protrusions 815 is $\varphi 2$, where $\varphi 2 < \varphi 1$.

Referring to the right figure of FIG. 4, a supporting surface 521b parallel to the bottom circumference is formed at an upper part inside the hollow column 521, a retention hole 523 corresponding to the retention column 811 is formed in the supporting surface 521b, and the retention column 811 is directly engaged with the retention hole 523, which restricts rotation of the locking member 810 relative to the machine head assembly 40 around the z-axis. A biasing spring 820 is arranged below the locking member 810, and a semi-cylindrical spring-passing member 812 passes through a centre of the biasing spring 820 to fix the biasing spring 820. An upper end of the biasing spring 820 abuts against a lower surface of the circular supporting disc 818, and a lower end thereof abuts against the supporting surface 521b of the hollow column 521.

The cylinder-like body 813 protrudes from a side face and an upper bottom surface of the earmuff-like housing 311 to form a button 816 to be operated by a user. When the biasing spring 820 is not compressed, an upper end thereof is located at a biasing position, thus biasing the locking member 810 upward until the circular supporting disc 818 is blocked by a lower bottom surface of the hollow column 316 (because r1<r2'). At this time, the six protrusions 815 are engaged with the six notches 313 therein, so that the adapter 300 cannot pivot around the z-axis relative to the locking member 810, thereby restricting the pivoting of the long rod assembly 30 around the z-axis relative to the machine head assembly 40.

When a user presses the button 816, it is necessary to overcome resistance from the biasing spring 820. The biasing spring 820 is compressed, and its upper end leaves the biasing position. The protrusions 815 move downward with the locking member 810 until they are separated from the notches 313. At this time, since a smooth part of a side face of the cylinder-like body 813 is opposite an inner side face of the hollow column 316 (r1' is equal to or slightly less than r1), and the periphery of the circular supporting disc 818 together with the protrusion 815 is opposite an inner side face of the hollow column 317 (r2' is equal to or slightly less than r2), the adapter 300 can pivot around the z-axis relative to the locking member 810, so that the long rod assembly 30 can pivot around the z-axis relative to the machine head assembly 40. A user can adjust the orientation of the long rod assembly 30 relative to the machine head assembly 40 according to a mark 315 (FIG. 6, detailed below) arranged on an upper surface of the earmuff-shaped housing 311.

When the user makes an adjustment to the desired orientation, the button 816 may be released. At this time, an upper end of the biasing spring 820 moves toward the biasing position, and the locking member 810 is biased upward until the circular supporting disc 818 is blocked by the lower bottom surface of the hollow column 316. At this time, the six protrusions 815 are engaged with the six notches 313 therein again, thereby restricting the pivoting of the long rod assembly 30 around the z-axis relative to the machine head assembly 40.

Figure 6:
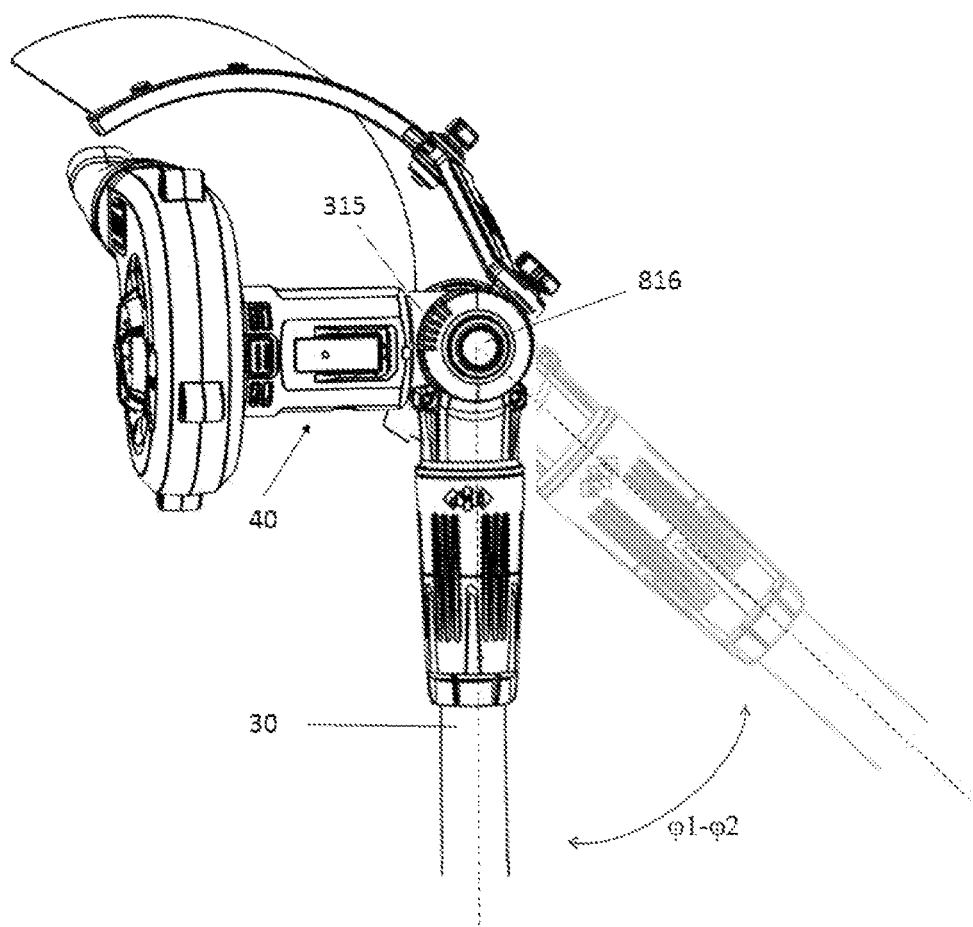
FIG. 6 illustrates a schematic diagram of pivoting of a long rod assembly relative to a machine head assembly according to an embodiment of the utility model.

Those skilled in the art can understand that the number and arrangement range of the notches 313 and the protrusions 815 are not limited to the above-mentioned embodiments, and the purpose is to limit the range of angle by which the long rod assembly 30 may pivot around the z-axis relative to the machine head assembly 40. Because a distance from a radial outermost end of the protrusion 815 to the z-axis is greater than the radius r1 of the inner side face of the hollow column 316, when any pair of oppositely formed protrusions 815 moves to a region outside the radian $\varphi 1$ of two sections arranged by the notches 313, after the button 816 is released, the pair of protrusions 815 will be blocked by the lower bottom surface of the hollow column 316 and cannot be engaged with the notches 313. Therefore, a pointer mark may be arranged on the button 816 to be aligned with the pivot range indicated by the mark 315, i.e., $\varphi 1-\varphi 2$. FIG. 6 illustrates a schematic diagram of pivoting of a long rod assembly 30 relative to a machine head assembly 40 according to an embodiment of the utility model. The mark 315 not only indicates to a user the angle range ($\varphi 1-\varphi 2$) of the long rod assembly 30 pivoting around the z-axis relative to the machine head assembly 40, but also indicates a minimum pivot angle to the user. The minimum pivot angle is defined by a radial included angle between adjacent notches 313.

Figure 7:
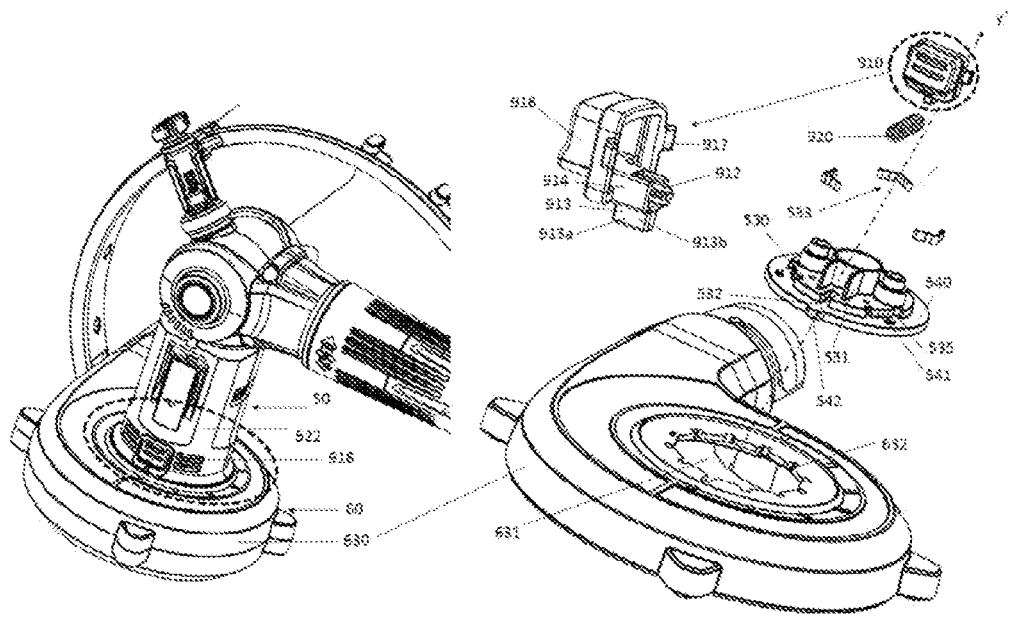
FIGS. 7-10 illustrate schematic diagrams of engagement between a driving unit and an operating unit according to an embodiment of the utility model.
Figure 8:
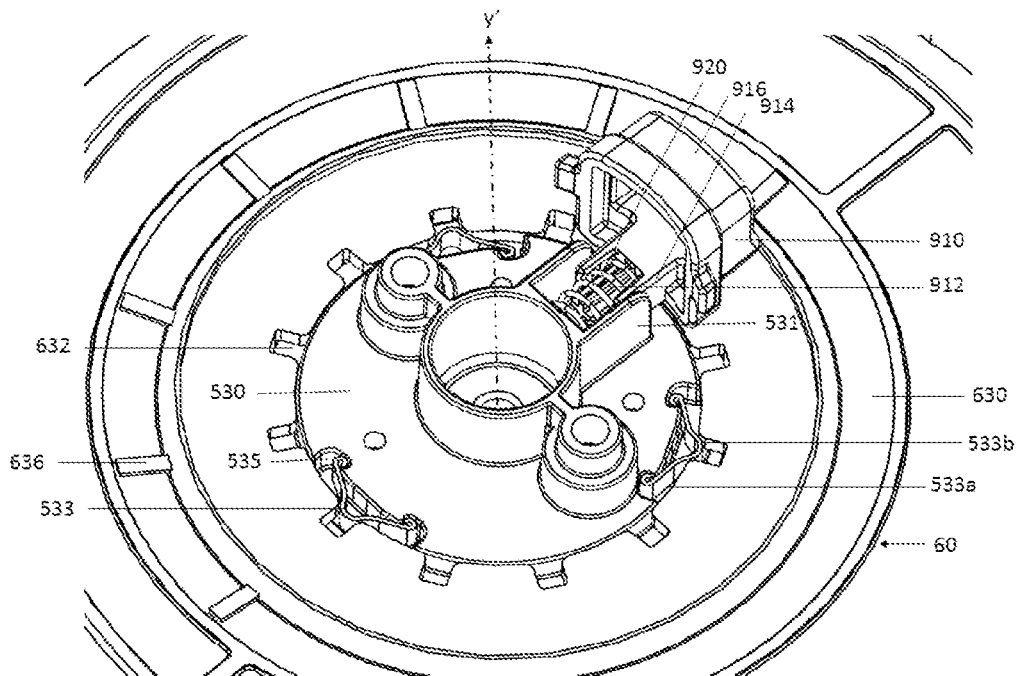
Figure 9:
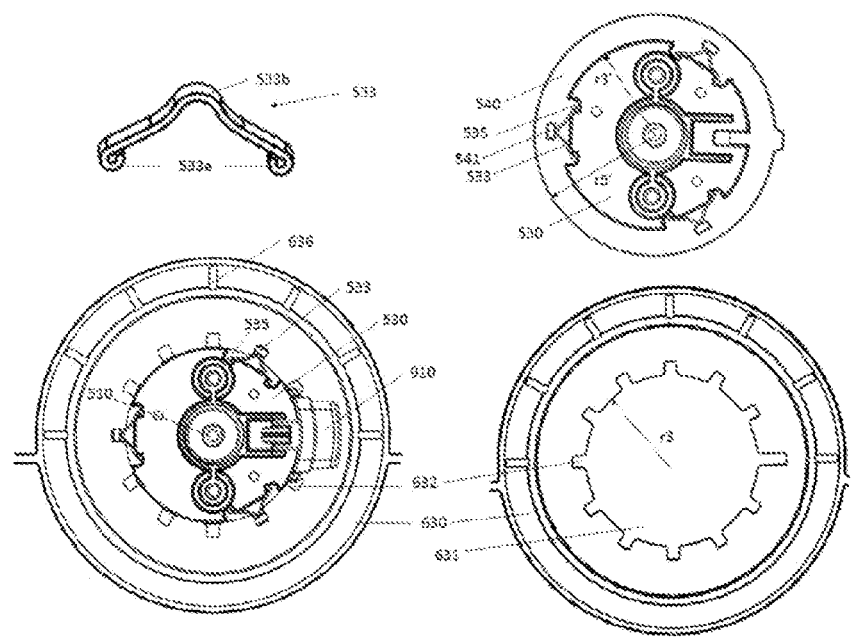
Figure 10:
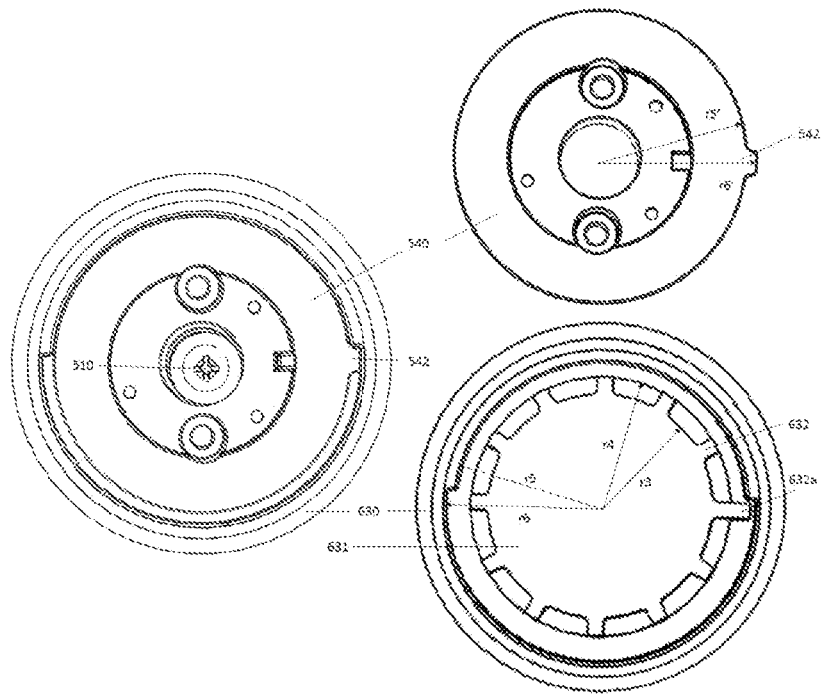

FIGS. 7-10 illustrate schematic diagrams of engagement between a driving unit 50 and an operating unit 60 according to an embodiment of the utility model. The left figure of FIG. 7 illustrates an engagement part of the driving unit 50 and the operating unit 60. The right figure of FIG. 7 is an exploded view of the engagement part, wherein components such as the hollow column 522 are hidden to show its internal structure, and an upper left corner of the right figure illustrates an enlarged view of the locking member 910. A y'-axis is a reverse direction of the extending direction of the motor output shaft 510 (FIG. 9 and FIG. 10). For ease of description, the positive direction of the y'-axis is taken as the upward direction and the reverse direction is taken as the downward direction. In a plane perpendicular to the y'-axis, the direction toward the y'-axis is regarded as the inward direction and the direction away from the y'-axis is regarded as the outward direction.

Figure 12:
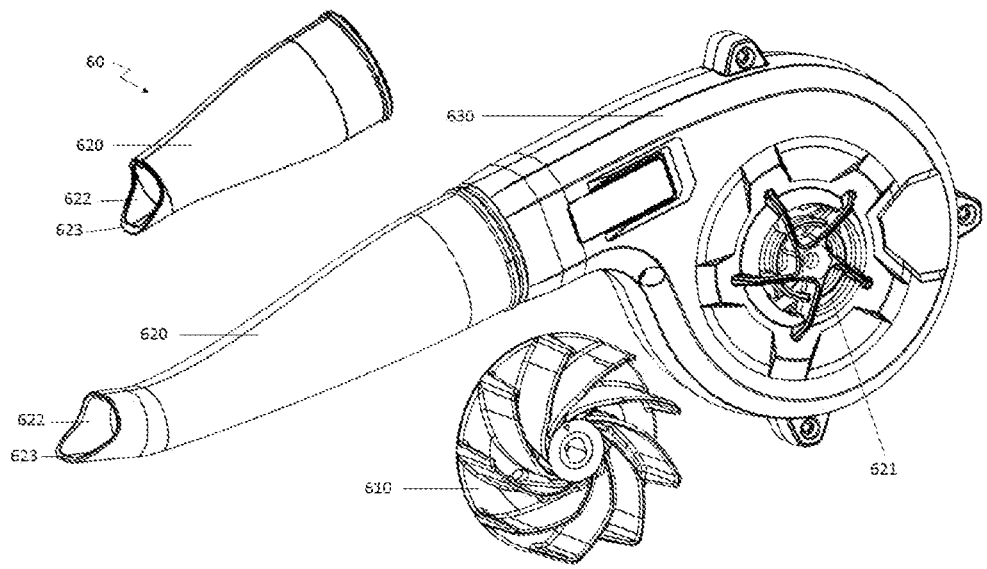
FIG. 12 illustrates a schematic diagram of an operating unit according to an embodiment of the utility model.

In conjunction with FIGS. 7-9, an engagement component engaged with the operating unit 60 is arranged at the lower part inside the hollow column 522. The engagement component is integrally formed by a layer of upper disc and a layer of lower disc, i.e., an upper disc 530 with a radius r3' and a lower disc 540 with a radius r5', wherein r3'<r5'. A circular opening 631 with a radius r3 is formed at the top of the operating unit housing 630, wherein r3 is equal to or slightly greater than r3'. The upper disc 530 and the lower disc 540 are engaged in the circular opening 631. The motor output shaft 510 extends and sequentially passes through a centre of the upper disc 530, a centre of the lower disc 540, and a centre of the circular opening 631 until it forms or is connected to a pivot shaft of the impeller 610 (FIG. 12). In a gutter cleaner of this embodiment, the motor output shaft 510 is directly connected to the operating unit 60. In some embodiments, the motor output shaft 510 may also be connected to the operating unit 60 through a gear set and/or another transmission structure.

A number of fixing members (not shown) are provided on an upper surface of the upper disc 530 to fix the upper disc 530, the lower disc 540 and the driving unit housing 520 together. FIG. 8 illustrates an enlarged view of engagement of a locking member 910, an upper disc 530, a lower disc 540 and an operating unit 60. As shown in FIG. 8, a U-shaped arm 531 is further formed on the upper surface of the upper disc 530. A biasing spring 920 is limited in a two-arm region of the U-shaped arm 531. In conjunction with the enlarged view of the locking member 910 in FIG. 7, a spring-passing member 912 on an inner side of the locking member 910 passes through a centre of the biasing spring 920. This not only serves to fix the biasing spring 920, but also restricts rotation of the locking member 910 around the y'-axis relative to the driving unit 50. An outer end of the biasing spring 920 abuts against the inside of a U-shaped arm 914, and an inner end thereof abuts against the inside of the U-shaped arm 531. A locking pin slot 532 extending in a radial direction is formed on the periphery of the upper disc 530, and is located below a central axis of the two arms of the U-shaped arm 531. In conjunction with the enlarged view of the locking member 910 in FIG. 7 and FIG. 8, the locking member 910 forms a locking pin 913 below the U-shaped arm 914, and the locking pin 913 may be divided into a near-notch part 913a and a near-slot part 913b. A length of the locking pin slot 532 is equal to or slightly greater than a length of the complete locking pin 913 (including the near-notch part 913a and the near-slot part 913b), so that the locking pin slot 532 can accommodate the complete locking pin 913. When sliding in the locking pin slot 532, the locking pin 913 may enter a region outside the locking pin slot 532 within the range of the two arms of the U-shaped arm 531 because a distance between the two arms of the U-shaped arm 914 is relatively narrow. A lower surface of the U-shaped arm 914 and a lower surface of a part of the housing of the locking member 910 abut against an upper surface of the upper disc 530 and an upper surface of the operating unit housing 630.

The engagement of the upper disc 530 with the operating unit housing 630 will be described in detail below. The lower left figure of FIG. 9 illustrates a view of engagement of an upper disc 530 with an operating unit housing 630 viewed in the reverse direction of the y'-axis, the upper left figure illustrates an enlarged view of an elastic member 533, the upper right figure separately illustrates views of the upper disc 530 and a lower disc 540 viewed in the reverse direction of the y'-axis, wherein the locking member 910 is hidden, and the lower right figure separately illustrates a view of an engagement part of the operating unit housing 630 viewed in the reverse direction of the y'-axis. In conjunction with FIGS. 7-9, three elastic members 533 are uniformly arranged on the periphery of the upper disc 530 in the circumferential direction. The elastic member 533 forms two arms 533a and a protrusion 533b. The two arms 533a are limited in a slot 535 of the elastic member formed on the periphery of the upper disc 530. The slot 535 of the elastic member is recessed inward in the radial direction as a whole, and the depths of the inward recesses at two ends are greater than that in the middle. The middle is wide outside and narrow inside to form inner hooks at both ends. Ends of the two arms 533a form outer hooks, which are matched with the inner hooks at both ends of the slot 535 of the elastic member, thereby restricting movement of the elastic member 533 in the circumferential direction relative to the upper disc 530. An outer side of the protrusion 533b abuts against a boss 541 formed on an upper surface of the lower disc 540. The boss 541 has a rectangular shape, and with a height of upward protrusion slightly higher than most of the upper surface of the lower disc 540. The outer side of the protrusion 533b abuts against an inner long side of the rectangle, so that the boss 541 applies a radial inward force on the elastic member 533, which can restrict the movement of the elastic member 533 in the radial direction relative to the upper disc 530. The slot 535 of the elastic member and the boss 541 act together so that the elastic member 533 will not be separated from the slot 535 of the elastic member.

Twelve notches 632 are uniformly arranged in the circumferential direction on the inner circumferential surface of the circular opening 631. The width of the notch 632 is smaller than a long side of the boss 541, so that the boss 541 located below the notch 632 will not be stuck in the notch 632 during relative movement. Because r3' is equal to or slightly less than r3, the upper disc 530 can pivot around the y'-axis in the circular opening 631. Because the protrusion 533b extends out of the range of the radius r3', the protrusion 533b can be engaged in the notch 632 during the aforementioned pivoting. Moreover, each time three protrusions 533b are engaged with three of the notches 632, the resistance to relative movement will increase. However, due to the elasticity of the protrusion 533b, the increased resistance will not be large enough to prevent the above-mentioned relative movement. Such an arrangement enables the operating unit 60 to pivot around the y'-axis relative to the driving unit 50 with the radial included angle between adjacent notches 632 as the minimum pivot angle. Moreover, due to the use of the elastic member 533, each time the protrusion 533b is engaged with the notch 632, auditory and/or tactile feedback will be provided to a user, to indicate the displacement generated by each engagement. The embodiments shown in FIGS. 7-9 not only provide audible indications to the user, but also provide visual indications to the user. Referring to FIG. 9, a mark 636 is also provided on the operating unit housing 630 to indicate the angle range of the operating unit 60 pivoting around the y'-axis relative to the driving unit 50 (described in detail later) and the minimum pivot angle. In the embodiment of the gutter cleaner, the pivoting angle range is preferably 180°, and the minimum pivot angle is preferably 30°. Those skilled in the art can understand that the number and arrangement range of the notches 632 and the elastic members 533 are not limited to the above-mentioned embodiments.

The engagement of the lower disc 540 with the operating unit housing 630 will be described in detail below. The operating unit housing 630 is formed by an upper housing and a lower housing. FIG. 10 illustrates only the upper half of the housing, and the operating unit housing 630 described in this section refers to only the upper half of the housing. The left figure of FIG. 10 illustrates a view of engagement of a lower disc 540 with an operating unit housing 630 viewed in the positive direction of the y'-axis, the upper right figure separately illustrates a view of the upper disc 530 and the lower disc 540 viewed in the positive direction of the y'-axis, and the lower right figure separately illustrates a view of the operating unit housing 630 viewed in the positive direction of the y'-axis. Referring to the lower right figure of FIG. 10, among the twelve notches 632, except for one deeper notch 632a, the radial depth of the remaining eleven notches is equal to or slightly less than r4-r3, and equal to or slightly greater than the wide side of the boss 541, so that the boss 541 can move on the lower surface (i.e., below the notch 632) of a discontinuous ring with an outer diameter r4 and an inner diameter r3, and this ring may be recorded as a ring (r4, r3). Referring to the lower right figure of FIG. 10, two semi-rings with different radial ring widths are formed on the outside of the ring (r4, r3). The two semi-rings protrude downward relative to the ring (r4, r3) and have the same protruding depth. One of the semi-rings has an outer diameter r5 and an inner diameter r4, which is recorded as a semi-ring (r5, r4); and the other semi-ring has an outer diameter r6 and an inner diameter r4, which is recorded as a semi-ring (r6, r4). r3<r4<r5<r6, and r5 is equal to or slightly greater than r5'. On the outer side of the two semi-rings, most of the lower surface except for the engagement part of the operating unit housing 630 further protruding downward relative to the two semi-rings is formed.

Referring to the upper right figure of FIG. 10, a protrusion 542 radially extending outward is formed on the periphery of the lower disc 540. The radial distance from the outermost end of the protrusion 542 to the y'-axis is r6', where r6' is equal to or slightly less than r6. Because r5' is equal to or slightly less than r5, the lower disc 540 may pivot around the y'-axis on the lower surface of the region defined by the semi-ring (r5, r4) and the semi-ring (r6, r4). Since r5 is less than r6' and r6' is equal to or slightly less than r6, the protrusion 542 can move only on the lower surface of the semi-ring (r6, r4) region. When moving to the junction of the two semi-rings, the protrusion 542 will be blocked by a downward protruding bulge at the junction, and cannot move to the lower surface of the semi-ring (r5, r4) region, thereby limiting the range of the angle by which the operating unit housing 630 may pivot around the y'-axis relative to the lower disc 540, and further limiting the range of the angle by which the operating unit 60 may pivot around the y'-axis relative to the driving unit 50. Such an arrangement is made because, in the embodiment of the gutter cleaner, the operating unit 60 only needs to pivot within a semi-circle toward the gutter side (see FIG. 11). In some embodiments, any angle range of the operating units 60 pivoting around the y'-axis relative to the driving unit 50 may be set according to differences in the operating units 60.

Referring to the enlarged view of the locking member 910 in FIG. 7, the locking member 910 comprises two lugs 917 formed by extending toward two sides in the circumferential direction of relative movement, and the two lugs are configured to abut against an inner surface of an engagement position of the hollow column 522. A part of the locking member 910 protruding outside the hollow column 522 constitutes a button 916 operated by the user. When the biasing spring 920 is not compressed, its outer end is located at a biasing position, thus biasing the locking member 910 outward until the lugs 917 are blocked by an inner surface of the hollow column 522. At this time, the near-notch part 913a is engaged with one of the notches 632. Because the near-slot part 913b is still in the locking pin slot 532, the upper disc 530 cannot pivot around the y'-axis in the circular opening 631, thereby restricting the pivoting of the operating unit 60 around the y'-axis relative to the driving unit 50.

When a user presses the button 916, it is necessary to overcome resistance from the biasing spring 920. The biasing spring 920 is compressed, and an outer end thereof is away from a biasing position, and the near-notch part 913a moves inward with the locking member 910 until being separated from the notch 632. At this time, because the entire near-notch part 913a and the entire near-slot part 913b slide into the locking pin slot 532, the upper disc 530 can pivot around the y'-axis in the circular opening 631, so that the operating unit 60 can pivot around the y'-axis relative to the driving unit 50. The user can adjust the orientation of the operating unit 60 relative to the driving unit 50 according to the mark 636 and the auditory indication and/or tactile feedback.

Figure 11:
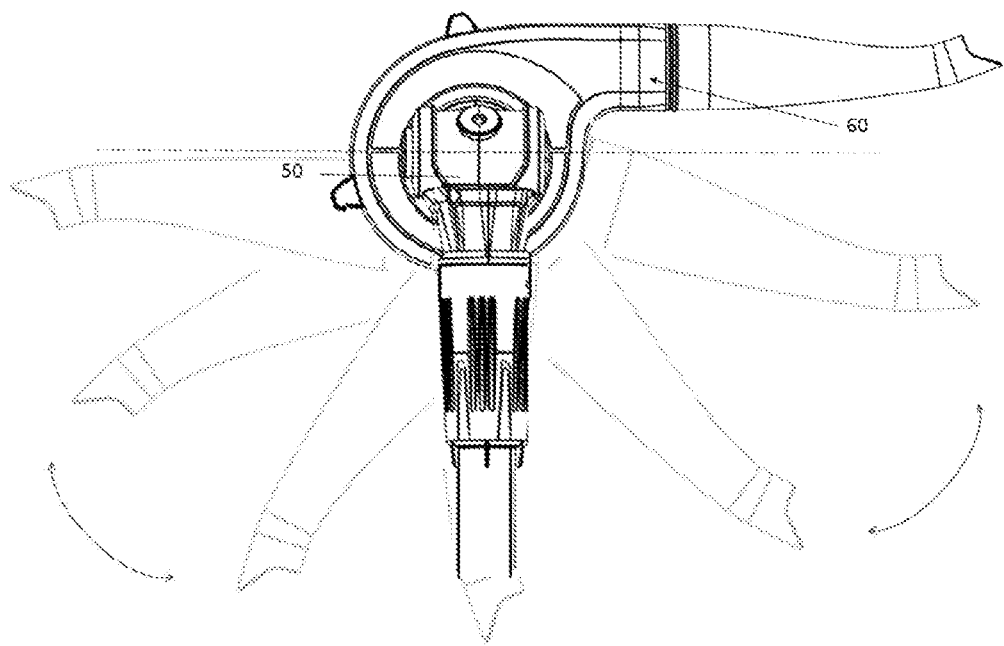
FIG. 11 illustrates a schematic diagram of pivoting of a driving unit relative to an operating unit according to an embodiment of the utility model.

When the user makes an adjustment to the desired orientation, the button 916 may be released. At this time, the outer end of the biasing spring 920 moves toward the biasing position, and the locking member 910 is biased outward until the lug 917 is blocked by the inner surface of the hollow column 522. At this time, the near-notch part 913a is engaged with one of the notches 632 again, thereby restricting the pivoting of the operating unit 60 around the y'-axis relative to the driving unit 50. FIG. 11 illustrates a schematic diagram of pivoting of an operating unit 60 around the y'-axis relative to a driving unit 50 according to an embodiment of the utility model.

It can be seen from FIG. 6 and FIG. 11 that the orientation of the operating unit 60 relative to the long rod assembly 30 may be adjusted in two degrees of freedom. Those skilled in the art can understand that the orientation of the operating unit 60 relative to the long rod assembly 30 may also be adjusted in more or fewer degrees of freedom, and the position of an adjustment interface is not limited to between the long rod assembly 30 and the machine head assembly 40 or between the operating unit 60 and the driving unit 50. Relative movement of two components between interfaces is not limited to pivoting, translation, etc. Engagement features are not limited to notches, slots, protrusions, locking pins, screws or nuts. The number, position, and form of the locking members 810 and 910 are not limited to the above-mentioned implementations.

Figure 13:
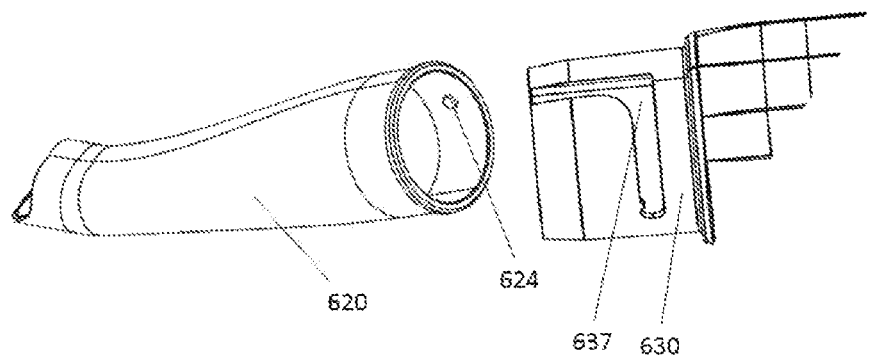
FIG. 13 illustrates a schematic diagram of engagement between an air outlet duct and an operating unit housing according to an embodiment of the utility model.

FIG. 12 illustrates a schematic diagram of an operating unit 60 according to an embodiment of the utility model. In the embodiment shown in FIG. 12, the operating unit 60 is a blower. The operating unit housing 630 forms into a turbine shape, and optimizing the turbine shape and the positions and shapes of an air inlet 621 and an air outlet 622 can generate more powerful wind with less power. The air inlet 621 is in such an arrangement that blades and debris are prevented from being sucked in. The impeller 610 is located in the operating unit housing 630 and behind the air inlet 621. The impeller 610 is shown separately at the bottom of FIG. 12. Another air outlet duct 620 with a smaller size is further provided at the upper left of FIG. 12. A user can configure air outlet ducts 620 of different sizes according to needs. The air outlet 622 forms a wedge-shaped scraping edge 623 protruding outward at a lower end of an outer edge close to a gutter. The wedge-shaped scraping edge 623 can scrape off leaves sticking to the gutter. FIG. 13 illustrates a schematic diagram of engagement between an air outlet duct 620 and an operating unit housing 630. A mounting hook 624 with a cylindrical protrusion is formed on the inner surface of the air outlet duct 620, and can slide along an L-shaped sliding groove 637 formed on the outer surface of the operating unit housing 630. A concave part and a clamping position are formed at an end of the L-shaped sliding groove 637. The mounting hook 624 may go over the concave part and slide into the clamping position at the end, so that the air outlet duct 620 is tightly engaged with the operating unit housing 630 in a convenient and detachable manner. Those skilled in the art can understand that, depending on differences in long-rod-type electric tools 10, an operating unit 60 may be in different forms, including but not limited to operating units 60 of a lawn mower, a trimmer, a pruner, and a cultivator.

Figure 14:
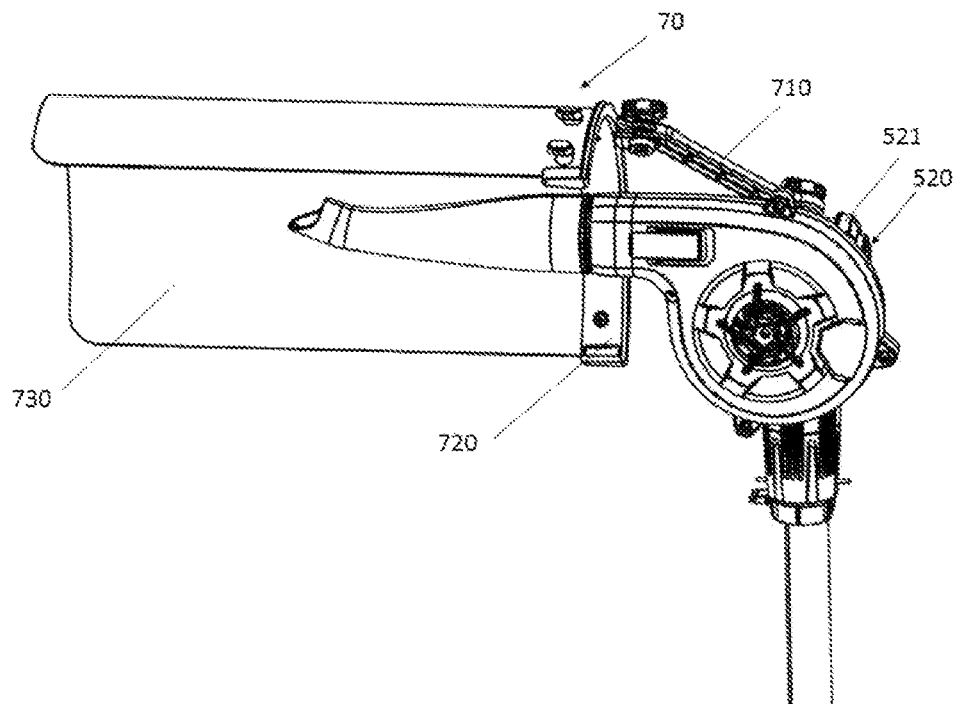
FIG. 14 illustrates a schematic diagram of a protective cover according to an embodiment of the utility model.

FIG. 14 illustrates a schematic diagram of a protective cover 70 according to an embodiment of the utility model. The protective cover 70 is generally provided near the operating unit 60. In the embodiment of the gutter cleaner, the protective cover 70 functions to prevent blades or debris and the like blown by the blower from falling on a user. The protective cover 70 comprises a connecting rod 710 engaged with the hollow column 521, an arc-shaped cover edge 720 engaged with the connecting rod 710, and a cover surface 730 using the cover edge 720 as a supporting edge and playing a protective role. So as not to obstruct the user's line of sight during operation, the cover surface 730 may be configured to be transparent.

Figure 15:
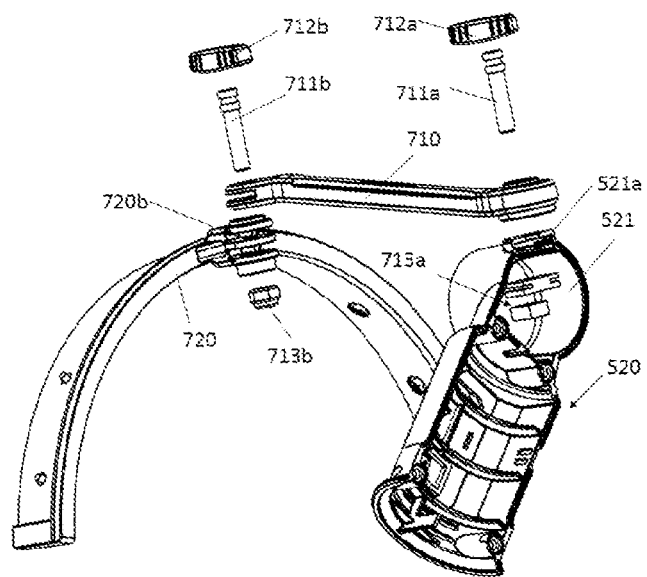
FIG. 15 illustrates an exploded view of engagement between a protective cover and a machine head assembly according to an embodiment of the utility model.

FIG. 15 illustrates an exploded view of engagement between a protective cover 70 and a driving unit housing 520 according to an embodiment of the utility model, wherein the cover surface 730, the operating unit 60, etc. are hidden. Two ends of the connecting rod 710 are each provided with rivets 711a and 711b. On a side of the hollow column 521 (only a half of the housing is shown), the rivet 711a passes through one end of the connecting rod 710 and is inserted into a receiving hole 521a formed on a side face of the hollow column 521. A fastener 713a is provided below the receiving hole 521a. On a side of the cover edge 720, the rivet 711b passes through the other end of the connecting rod 710 and is inserted into a receiving hole 720b formed in the middle of the cover edge 720. A fastener 713b is provided below the receiving hole 720b. Top ends of the rivets 711a and 711b constitute knobs 712a and 712b for a user to operate. The user adjusts or fixes the position and direction of the protective cover 70 by releasing or tightening the knobs 712a and 712b.

Figure 16:
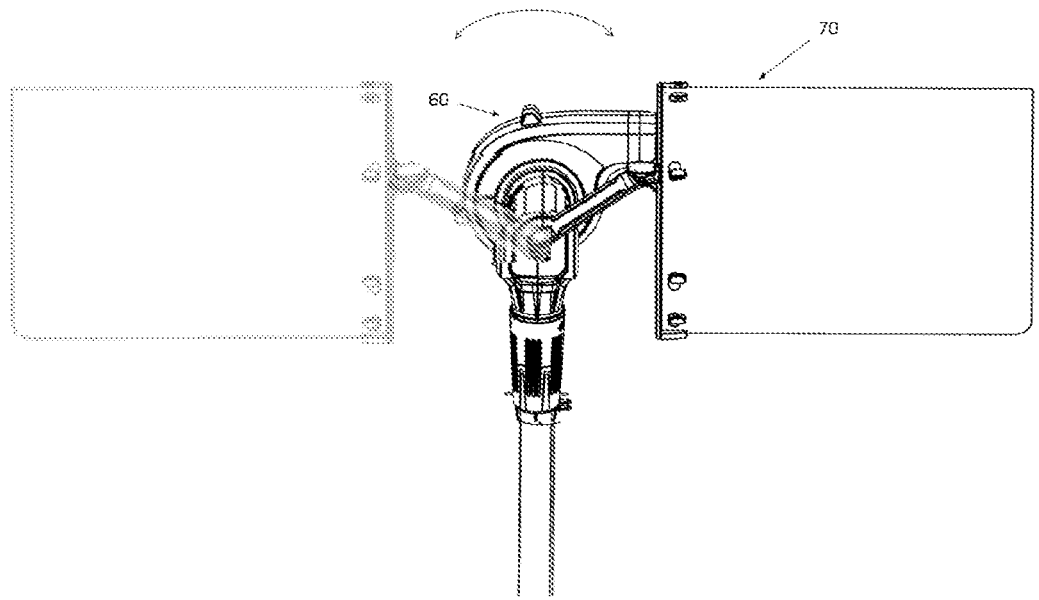
FIG. 16 illustrates a schematic diagram of an adjustable orientation of a protective cover relative to an operating unit according to an embodiment of the utility model.

FIG. 16 illustrates a schematic diagram of an adjustable orientation of a protective cover 70 relative to an operating unit 60 according to an embodiment of the utility model. Two ends of the connecting rod 710 may be used to adjust the orientation of the protective cover 70 relative to the operating unit 60, so that the protective cover 70 is adjusted more flexibly. Those skilled in the art can understand that the protective cover 70 may be arranged in different forms, and different engagement positions and/or methods, etc. may be selected according to differences in operating units 60.

The utility model is shown and described in detail above in conjunction with the accompanying drawings, but it should be regarded as illustrative rather than restrictive. It should be understood that only exemplary embodiments are shown and described, and the utility model is not limited in any way. It can be understood that any feature described herein may be used in any embodiment. The illustrative embodiments do not exclude each other or exclude other embodiments not listed herein. Therefore, the utility model also provides one or a combination of more of the above-mentioned exemplary embodiments. Modifications and variations may be made to the utility model without departing from the spirit and scope of the utility model. Therefore, such a limitation should only be made as defined by the appended claims.

The invention claimed is:

1. A long-rod-type electric tool comprising:
a handle assembly comprising a power supply unit;
a machine head assembly comprising:
a driving unit comprising a motor; and
an operating unit,
wherein the operating unit comprises an impeller coupled directly to an output shaft of the motor, and wherein the operating unit is configured to generate airflow through an air outlet of the long-rod-type electric tool;
a long rod assembly arranged between the handle assembly and the machine head assembly; and
an adjustable interface comprising a first interface and a second interface, wherein the second interface is disposed between the motor and the operating unit, wherein an orientation of the operating unit relative to the long rod assembly is respectively adjustable in a first degree of freedom through rotational adjustment of the first interface and adjustable in a second degree of freedom through rotational adjustment of the second interface.

2. The long-rod-type electric tool of claim 1, wherein the driving unit is disposed serially between the first interface and the second interface.

3. The long-rod-type electric tool of claim 2, wherein an orientation of the driving unit is pivotable relative to a first axis, and the orientation of the operating unit is pivotable relative to a second axis.

4. The long-rod-type electric tool of claim 2, further comprising a protective cover coupled to the long-rod-type electric tool at an opposite side of the driving unit from the operating unit, wherein an orientation of the protective cover relative to the operating unit is adjustable.

5. The long-rod-type electric tool of claim 2, wherein the adjustable interface is formed between a first component and a second component, the adjustable interface comprises a first engagement feature provided on the first component and a second engagement feature provided on the second component, and engagement between the first engagement feature and the second engagement feature restricts movement of the first component relative to the second component.

6. The long-rod-type electric tool of claim 5, wherein the first engagement feature comprises a plurality of notches arranged in a circumferential direction, and the second engagement feature comprises at least one protrusion configured to be engaged with the plurality of notches.

7. The long-rod-type electric tool of claim 6, wherein the second engagement feature comprises a locking member, and engagement of the locking member with the second component restricts movement of the locking member relative to the second component in the at least one degree of freedom.

8. The long-rod-type electric tool of claim 1, wherein the first and second interfaces are contained in the machine head assembly.

9. The long-rod-type electric tool of claim 5, wherein at least one of the first component and the second component comprises a visual indicating device, and the visual indicating device is configured to indicate movement of the first component relative to the second component in the at least one degree of freedom.

10. The long-rod-type electric tool of claim 5, wherein at least one of the first component and the second component comprises an auditory indicating device, and the auditory indicating device is configured to indicate movement of the first component relative to the second component in the at least one degree of freedom.

11. The long-rod-type electric tool of claim 10, wherein the auditory indicating device comprises a plurality of notches arranged in a circumferential direction, and an elastic member configured to be engaged with the plurality of notches to issue an auditory indication.

12. The long-rod-type electric tool of claim 5, wherein one of the first component and the second component is the long rod assembly, and the other of the first component and the second component is the machine head assembly.

13. The long-rod-type electric tool of claim 5, wherein one of the first component and the second component is the operating unit, and the other of the first component and the second component is the driving unit.

14. A gutter cleaner comprising:
a handle assembly comprising a power supply unit;
a machine head assembly comprising:
 a motor having an output shaft;
 an impeller coupled to the output shaft and driven by the motor;
 an operating unit housing the impeller and directing airflow through an air outlet of the operating unit housing; and
 an adjustable interface comprising a first interface and a second interface, wherein an orientation of the airflow through the air outlet is respectively adjustable relative to the handle assembly through adjustment of the first interface and adjustable relative to the motor through adjustment of the second interface, and wherein the first and second axis are oriented perpendicular to one another;
a long rod assembly arranged between the handle assembly and the machine head assembly; and
a protective cover coupled to the gutter cleaner at an opposite side of the motor from the impeller,
wherein an orientation of the protective cover relative to the operating unit housing is adjustable.

15. The gutter cleaner of claim 14, wherein the motor is disposed between the first and second interfaces, and wherein a relative angle of airflow through the air outlet is adjustable with respect to the handle assembly without adjusting a relative angle of the motor with respect to the handle assembly.

16. The gutter cleaner of claim 14, wherein the first interface is movable from a locked state to an unlocked state by moving a first button in a first direction, wherein the second interface is movable from a locked state to an unlocked state by moving a second button in a second direction, and wherein the first and second directions are always oriented parallel with respect to one another.

17. The gutter cleaner of claim 14, wherein the first interface comprises a circumferential notched interface comprising a first plurality of notches and a second plurality of notches each arranged in a same radian range of two opposite sections in a circumferential direction and spaced apart from one another in the circumferential direction by non-notched sections.

18. The gutter cleaner of claim 14, wherein the protective cover moves with the operating unit housing when the adjustable interface is adjusted through only the first interface, and wherein the protective cover moves separately from the operating unit housing when the adjustable interface is adjusted through the second interface.

19. The gutter cleaner of claim 14, wherein the long rod assembly is telescopic.

* * * * *